TIMING SYNCHRONIZATION BY RADIO FREQUENCY COMMUNICATION

Filed July 27, 1961

INVENTOR.
MARTIN B. BRILLIANT
BY Kenway, Jenney & Hildreth
ATTORNEYS

United States Patent Office 3,128,465

Patented Apr. 7, 1964

3,128,465

TIMING SYNCHRONIZATION BY RADIO FREQUENCY COMMUNICATION

Martin B. Brilliant, Cambridge, Mass., assignor to National Company, Inc., Melrose, Mass., a corporation of Massachusetts Filed July 27, 1961, Ser. No. 127,249
6 Claims. (Cl. 343—225)

This invention relates to a system of timing synchronization by radio frequency communication and more particularly, it relates to a system for synchronizing a local clock and a remote standard clock with precise compensation for the propagation times of the synchronizing signals.

It is often necessary to synchronize one or a plurality of remotely located clocks with a single standard clock as is the case, for instance, in missile and satellite tracking. Radio signals from these vehicles are received at widely separated stations which record the signal on tapes together with locally generated timing signals. As many as several dozen stations may be required to track portions of an entire flight or pass, since each station can monitor the signal only when the vehicle is within its limited receiving range. Compilation of the data from the multiple receiving stations requires highly precise synchronization of the timing signals at the various stations, since otherwise it would be difficult or impossible to tell where the monitored signals from the various stations overlap, i.e. several stations receive the same signal, or have a gap, i.e. none of the stations receive the signal.

Although the clocks for generating the timing signals locally are highly accurate, small errors may be compounded over a period of time. One method of synchronizing the local clocks is to have a standard clock send out timing signals which can be used as a reference by the local clocks. In high accuracy timing systems, the errors introduced because of propagation delay, that is the time it takes the signal to travel from the transmitter at the standard clock to the receiver at the local station, cannot be tolerated. In order to obtain higher accuracy, two-way transmission of high frequency synchronizing signals has been proposed. In a two-way transmission system, the local station sends out a signal to the standard which causes the standard to send back a reply signal. By measurement of the time for the round trip, the propagation delay can be determined. This technique is not entirely satisfactory, however, because it requires explicit measurement of the propagation delay in a highly precise manner. Furthermore, the interrogation and reply signals usually do not travel in single straight lines, but rather traverse several different paths, called multipaths. If two or more of the paths have propagation times that are very nearly equal, it may be difficult or impossible to resolve the paths and determine the propagation times of the signals.

Accordingly, it is the primary object of my invention to provide an improved time synchronizing system of high accuracy employing high frequency signals. It is another object of my invention to provide a system which minimizes errors due to propagation delays of the synchronizing signals. A further object of my invention is to provide a system in which transmission multipaths of the signals need not be resolved. It is a further object of my invention to provide a system in which the propagation delay time need not be measured. Other objects of my invention will be apparent from the following detailed description taken in connection with the accompaying drawing in which:

Figure 1:
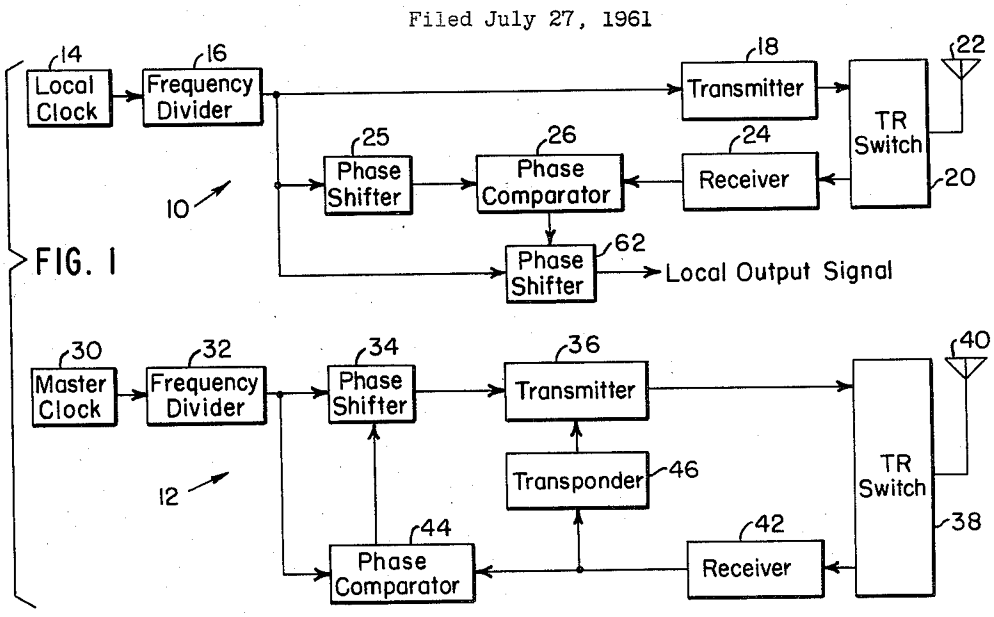
FIG. 1 is a block diagram of a system embodying my invention.

In FIG. 1, a local station is shown generally at 10; and a master control station is shown generally at 12. The local station 10 has a high accuracy timing device 14, such as an atomic clock, which is adapted to provide a sinusoidal signal of highly stable frequency such as five megacycles per second. This five megacycle signal is applied to divider 16 and from the divider there is obtained a timing reference signal of correlated frequency, such as ten kilocycles per second, which is used to modulate a transmitter 18. The selection of a preferred frequency for the timing reference signal at the local station will be discussed hereinafter.

Connecting the transmitter 18 to an antenna 22 is a transmit-receive switch 20. The transmit-receive switch 20 permits the antenna 22 to be used as a receiving antenna for a receiver 24 as well as for transmitting. That is to say, the transmit-receive switch 20 functions to disconnect the antenna 22 from the receiver 24 when the transmiter is operating.

There is also provided a phase comparator 26, to compare the phase of the received signal with the phase of a reference signal derived from the frequency divider 16. To this end, the comparator has a first input connected to the divider through a phase shifter 25 and a second input connected to the receiver directly. The phase shifter 25 compensates for the fixed phase delays in the transmitting and receiving processes which are introduced at the local and master control stations. The phase comparator derives a direct voltage representative of the phase difference between the reference signal and the received signal. In response to this direct voltage, a variable phase shift of the frequency divider output signal is produced by a phase shifter 62 from which a local output signal is obtained for timing purposes.

The device employed for synchronization of the local clock is another atomic clock 30 at the master station. Coupled to the clock 30 is a frequency divider 32 to supply a synchronizing signal of substantially the same frequency as the reference signal at the local station 10. This synchronizing signal is passed through a phase shifter 34 and applied to a transmitter 36 as a modulating signal. The output of transmitter 36 is connected by a transmit-receive switch 38 to an antenna 40. A receiver 42 is likewise connected to the antenna by the transmit-receive switch 38 and has is output connected to a phase comparator 44. The transmitter 36, the transmit-receive switch 38, the antenna 40, the receiver 42, and the phase comparator 44 can be of like nature as their counterparts at the local station 10. In addition, a transponder device 46 is provided which is responsive to signals from the receiver 42. Transponder 46 controls the operation of the transmitter 36 and can be of the same type used for transponder radio beacons. That is to say, when a signal is received from the local station, the transponder device 46, in response to a signal from the receiver 42, keys the transmitter 36, on and thereby causes a signal to be sent back to the local station 10.

The output of the phase comparator 44 controls the amount of phase shift introduced at the master station 12 before the synchronizing signal is transmitted. A number of ways of introducing such a phase shift are known to those skilled in the art. For example, a convention rotary transformer type phase shifter can be provided using a pair of crossed coils to which the synchronizing signal is applied in phase quadrature relation, and a pickup coil to derive an output signal of variable phase depending upon its angular position in the field of the stator coils. A conventional servo motor which is responsive to the output of the phase comparator 44 can be used to rotate the pickup coil and thereby vary the phase of the output signal derived thereby.

Figures 2, 3:
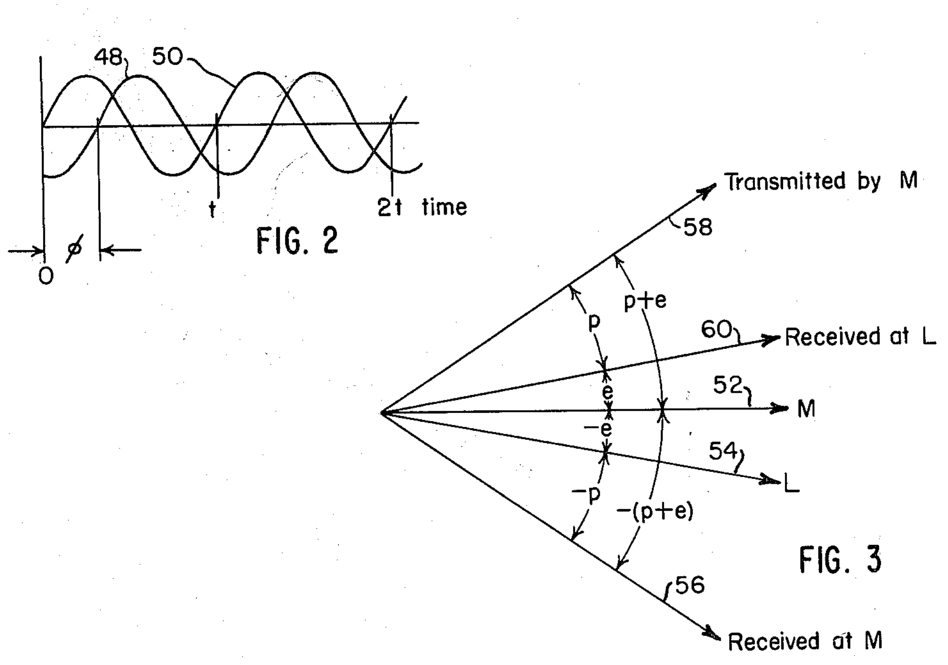
FIG. 2 is a schematic representation of the timing signals used in the embodiment of FIG. 1.
FIG. 3 is a phasor diagram illustrating the sequence of signals used to perform one complete timing synchronization cycle.

In FIG. 2 there are shown two sinusoidal signals 48 and 50 such as might be derived from the master and local clocks. Synchronizing signal 50 derived from the clock 30 at the master station 12 can be represented by the function $\sin(\omega t)$, where $\omega$ is the angular frequency of the signal. Likewise, reference signal 48 derived from the clock 14 at the local station 10 can be represented by the function $\sin(\omega t+\phi)$, $\phi$ being the phase angle of the reference signal 48 with respect to that of the synchronizing signal 50. This phase angle can be taken as a measure of the time difference between the clocks. Merely measuring the phase angle between signal 48 and the synchronizing signal 50 as received at the local station will not give the phase displacement $\phi$ precisely, however, since an appreciable phase delay takes place in transit of the signal between stations. With the apparatus described in FIG. 1, an interrogation and reply sequence is afforded which compensates for this phase delay. This interrogation-reply sequence may best be understood by reference to the phasor diagram of FIG. 3.

In FIG. 3 the vector 52 represents the synchronizing signal generated by clock 30 at master station 12 and the vector 54 represents the reference signal from clock 14 at local station 10. The deviation of the local clock from the master clock is represented by the phase difference "$-e$" between the vectors 52 and 54. According to the invention, the reference signal from the local station 10 is transmitted via the locally generated carrier wave to the master station 12 where the reference signal in the form of carrier modulation is detected by the receiver 42 and compared in the phase comparator 44 with the phase of the synchronizing signal derived from the clock 30. The reference signal as detected by the receiver 42 is represented by vector 56 which is seen to have a phase displacement $-(p+e)$ where $p$ is the phase delay introduced by the transmitting medium during propagation of the signal from the local to the master station. In consequence of the phase displacement $-(p+e)$ the phase comparator produces an error signal which causes the phase shifter 34 to produce a phase shift of the synchronizing signal of a magnitude equal to $(p+e)$, the magnitude of the phase error of the received signal, but of opposite sign. This phase shift is reflected in the reply signal transmitted by the transmitter 36 as shown by the vector 58 in FIG. 3. If the propagation phase shifts are independent of the direction of propagation as is ordinarily the case, a phase displacement "$p$" is once more introduced so that the synchronizing signal detected by the receiver 24 at the local station 10 and represented by vector 60, has a phase displacement "$e$" with respect to the synchronizing signal as it exists at the master station. The phase difference between the vector 54 and the vector 60 is seen to be equal to $2e$. Halving of this phase difference $2e$ at the local station thus leads to the proper correction factor needed to synchronize the clock 14 with the clock 30, while avoiding the need for actual measurement of the phase error "$p$" introduced during propagation.

By way of example a corrected output signal can be derived from the modulation signal at the local station using a phase shifter 62 of like nature as phase shifter 34. Thus, as shown in FIG. 1, the signal from the frequency divider 16 is also applied to phase shifter 62 which introduces a variable phase shift under control of the phase comparator 26. The output of the phase shifter then comprises the useful output signal as shown. Because of changes in the propagation phase shift, possible random nonreciprocity of propagation, noise, and other sources of error, it is contemplated that interrogation and reply, sequences will be instituted repetitively, each constituting an independent measurement of the timing error. Since several interrogation-reply cycles can be completed in one second, several hundred independent measurements can be made in a few minutes, and the accuracy obtainable over a single measurement can thus be improved by a corresponding order of magnitude.

In the preferred embodiment of my invention each signal which is used to modulate one of the station transmitters 18 and 36 is a sinusoid. If the signal is transmitted by multipaths, a number of sinusoidal signals having different phases are received which combine to form a resultant sinusoid exhibiting the propagation phase delay "$p$." Therefore, no error is introduced by multi-path transmission of the radiating signals, assuming the multipaths are the same in each direction.

The frequency of the modulation signal in my preferred embodiment is of the order of 10 kc. as aforementioned. This corresponds to a period of $10^{-4}$ seconds, so that phase errors can easily be determined to a small fraction of this order of magnitude. If phase errors greater than a single period are encountered, however, a cyclic ambiguity is introduced, that is the phase comparator 26 cannot distinguish phase errors of $2e$, $2e+2\pi$, $2e+4\pi$ and so forth. One way to resolve this ambiguity, for example, is to make a preliminary phase correction with modulating signals of lower frequency such that the period of the signals is greater than any phase error to be expected.

As will be apparent to those skilled in the art, the embodiment described is susceptible of various such modifications within the spirit and scope of the invention, and therefore it will be appreciated that all matter contained in the above description or shown in the accompanying drawings shall be interpreted as illustrative only and not in a limiting sense.

What is claimed is:

1. Apparatus for synchronizing signals generated at a local station with signals generated at a master station, said apparatus comprising means located at said local station to transmit to said master station recurrent signals manifesting the timing of said local signals, means located at said master station to determine the timing deviation of the signals received from said local station with respect to the signals generated at said master station, means located at said master station to transmit to said local station recurrent signals manifesting a timing deviation from said master signals equal and opposite to that of the signals received at said master station, means located at said local station to determine the timing deviation of the signals received from said master station with respect to the signals generated at said local station, and means to introduce a correction of the timing of said local signals corresponding to approximately one-half of the amount of the deviation determined at said local station.

2. Apparatus for synchronizing signals generated at a local station with signals generated at a master station remote therefrom, said apparatus comprising means located at said local station to transmit to said master station radio frequency signals bearing modulation signals representative of the timing of said local signals, means located at said master station to demodulate the radio frequency signals received from said local station, means located at said master station to determine the timing deviation of the modulation signals received at said master station with respect to the signals generated at said master station, means located at said master station to transmit to said local station radio frequency signals bearing modulation signals representative of a timing deviation from said master signals equal and opposite to that of the modulation signals received at said master station, means located at said local station to demodulate the radio frequency signals received from said master station, means located at said local station to determine the timing deviation of the modulation signals received at said local station with respect to the signals generated at said local station, and means to effect a correction of the signals generated at said local station corresponding to approximately one-half the timing deviation determined at said local station.

3. Apparatus for synchronizing sinusoidal signals at a local station with sinusoidal signals at a master station, said apparatus comprising means located at said local station to transmit to said master station the signals produced at said local station, means located at said master station to determine the phase deviation of the signals received from said local station with respect to the signals produced at said master station, means located at said master station to transmit to said local station phase shifted master signals having a phase deviation from the signals produced at said master station equal and opposite to that of the signals received at said master station, means located at said local station to determine the phase deviation of the signals received from said master station with respect to the signals produced at said local station, and means to cause a phase shift of the signals produced at said local station corresponding to approximately one-half the amount of the phase deviation determined at said local station.

4. Apparatus for synchronizing a local clock with a master clock remote therefrom, said apparatus comprising means located at said local station to derive an audio-frequency signal manifesting the timing of said local clock, means located at said local station to transmit to said master station a radio frequency carrier signal modulated by said audio-frequency signal, means located at said master station to generate an audio-frequency signal manifesting the timing of said master clock, means located at said master station to demodulate the radio frequency signal received from said local station, means located at said master station to determine the phase deviation of the modulation signal received from said local station with respect to the audio-frequency signal derived at said master station, means located at said master station to shift the phase of the audio-frequency signal derived at said master station by an amount equal and opposite to the phase deviation of the modulation signal received from said local station, means located at said master station to transmit to said local station a radio frequency carrier signal modulated by the phase shifted audio-frequency signal, means located at said local station to demodulate the radio frequency signal received from said master station, means located at said local station to determine the phase deviation of the modulation signal received from said master station with respect to the audio-frequency signal derived at said local station, and means located at said local station to introduce a correction of the phase of the audio-frequency signal derived at said local station corresponding approximately to one-half the phase deviation determined at said local station.

5. Apparatus for synchronizing a local station clock with a master station clock, said apparatus comprising means located at said local station to derive an audio-frequency signal manifesting the timing of said local clock, a transmitter located at said local station to transmit to said master station a radio frequency carrier signal modulated by the audio frequency derived at said local station, means located at said master station to derive an audio-frequency signal manifesting the timing of said master clock, means located at said master station to demodulate the radio frequency signal received from said local station, means located at said master station to determine the phase deviation of the modulation signal received from said local station with respect to the audio-frequency signal derived at said master station, means located at said master station to shift the phase of the audio-frequency signal derived at said master station by an amount equal and opposite to that of the phase deviation of the modulation signal received from said local station, means located at said master station to transmit to said local station a radio frequency carrier signal modulated by the phase shifted audio-frequency signal derived at said master station, a receiver at said local station for the radio frequency signals transmitted by said master station, said receiver providing an audio-frequency signal representing the modulation carried by the radio frequency signal from said master station, a phase comparator having a pair of input circuits and an output circuit, a first of said input circuits being coupled to said receiver, a phase shifter coupled between the other of said input circuits and said means to derive an audio-frequency signal at said local station, said phase shifter providing a fixed phase delay corresponding to the fixed phase delays of said audio-frequency signals introduced at said local and master stations, and a variable phase shifter coupled to the output circuit of said phase comparator to produce a phase shift of the audio-frequency signal derived at said local station corresponding in amount to approximately one-half the phase deviation determined by said phase comparator.

6. Apparatus for synchronizing a local station clock with a master station clock, said apparatus comprising means located at said local station to derive an audio-frequency signal manifesting the timing of said local clock, means located at said local station to transmit to said master station a radio frequency carrier signal modulated by the audio frequency signal derived at said local station, means located at said master station to derive an audio-frequency signal manifesting timing of said master clock, a receiver located at said master station to provide an audio-frequency signal representative of the modulation carried by the radio frequency signal from said local station, a phase comparator having a pair of input circuits and an output circuit, one of said input circuits being coupled to said receiver and the other of said input circuits being coupled to said means for deriving an audio-frequency signal at said master station, a phase shifter coupled to the output circuit of said phase comparator for shifting the phase of the audio-frequency signal derived at said master station, a transmitter located at said master station to transmit to said local station radio frequency carrier signals modulated by the phase shifted audio-frequency signal derived at said master station, a transponder to enable said transmitter at said master station to transmit only in response to the radio frequency signal received from said local station, means located at said local station to demodulate the radio frequency signal received from said master station, means located at said local station to determine the phase deviation of the modulation signal received from said master station with respect to the audio-frequency signal generated at said local station, and means to introduce a correction of the audio-frequency signal generated at said local station corresponding to approximately one-half the timing deviation determined at said local station.

No references cited.